(12) United States Patent
Chung

(10) Patent No.: US 8,150,455 B2
(45) Date of Patent: Apr. 3, 2012

(54) METHOD AND SYSTEM FOR INTEGRATING A COMPUTER MOUSE FUNCTION IN A MOBILE COMMUNICATION DEVICE

(75) Inventor: Chien-Chung Chung, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 676 days.

(21) Appl. No.: 11/945,990

(22) Filed: Nov. 27, 2007

(65) Prior Publication Data

US 2009/0137269 A1 May 28, 2009

(51) Int. Cl.
*H04M 1/00* (2006.01)
*G06F 3/039* (2006.01)
(52) U.S. Cl. .............. 455/556.1; 345/163; 345/158
(58) Field of Classification Search ............. 455/556.1, 455/556.2, 557, 558; 345/158, 163, 168
See application file for complete search history.

(56) References Cited

U.S. PATENT DOCUMENTS

| | | | |
|---|---|---|---|
| 7,440,770 B2 * | 10/2008 | Miyashita | 455/550.1 |
| 7,643,850 B2 * | 1/2010 | Thijssen et al. | 455/557 |
| 2004/0259591 A1 * | 12/2004 | Grams et al. | 455/556.1 |
| 2005/0007343 A1 * | 1/2005 | Butzer | 345/163 |
| 2005/0243062 A1 * | 11/2005 | Liberty | 345/158 |
| 2007/0173287 A1 * | 7/2007 | Henson et al. | 455/557 |
| 2007/0202914 A1 * | 8/2007 | Maaloe | 455/550.1 |

* cited by examiner

*Primary Examiner* — Blane J Jackson
(74) *Attorney, Agent, or Firm* — Patterson & Sheridan, LLP

(57) ABSTRACT

A method and system are implemented for controlling the position of a cursor on a display screen of a remote host device with a mobile communication device. The method comprises establishing a communication link between the mobile communication device and the selected remote host device, detecting an amount of displacement of the mobile communication device, converting the detected amount of displacement into displacement data of the cursor in a coordinate format compatible with the display screen of the host device, and transmitting the displacement data to the remote host device.

18 Claims, 6 Drawing Sheets

METHOD AND SYSTEM FOR INTEGRATING A COMPUTER MOUSE FUNCTION IN A MOBILE COMMUNICATION DEVICE

BACKGROUND OF THE INVENTION

1. Field of the Invention

The present invention relates generally to portable electronic devices, more particularly to a method and system for integrating a computer mouse function in a mobile communication device.

2. Description of the Related Art

Unless otherwise indicated herein, the approaches described in this section are not prior art to the claims in this application and are not admitted to be prior art by inclusion in this section.

Currently commercialized laptop computers have a touch pad that enables the user to control the cursor on the display screen of the laptop computer. However, because the touch pad may not be convenient to manipulate, a user generally prefers connecting a separate computer mouse device to the laptop computer to control the cursor. However, bringing an extra computer mouse device with the laptop computer may be cumbersome to the user, for example when the user is traveling in a short distance.

Therefore, what is needed is a method and system that is able to integrate a computer mouse function in a multifunction mobile device, and address at least the problems set forth above.

SUMMARY OF THE INVENTION

In one embodiment, the present application describes a method for controlling the position of a cursor on a display screen of a remote host device with a mobile communication device. The method comprises establishing a communication link between the mobile communication device and the remote host device, detecting an amount of displacement of the mobile communication device, converting the detected amount of displacement into displacement data of the cursor in a coordinate format compatible with the display screen of the remote host device, and transmitting the displacement data to the remote host device.

In another embodiment, a mobile communication device is disclosed. The mobile communication device a memory, a motion sensor, a wireless data transport module, and a processing unit configured to establish a communication link with a remote host device having a display screen adapted to visualize a cursor, convert a detected amount of displacement of the mobile communication device into displacement data of the cursor in a coordinate format compatible with the display screen of the remote host device, and transmit the displacement data to the remote host device.

In yet another embodiment, a computer system is described. The computer system comprises a host computer device having a display screen adapted to visualize a cursor, and the mobile communication device as described above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
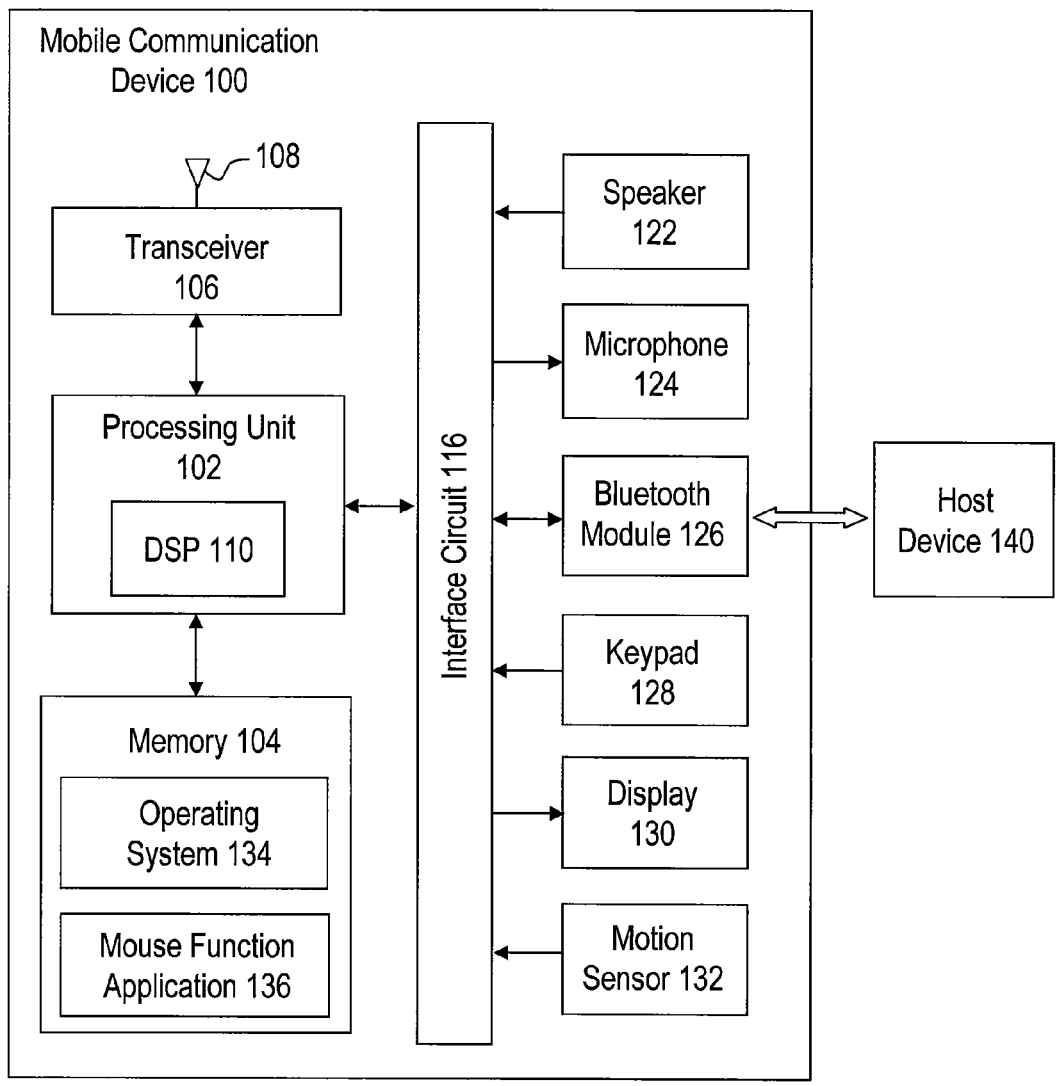
FIG. 1 is a schematic diagram of a mobile communication device implementing one or more aspects of the present invention.

FIG. 1 is a schematic diagram of a mobile communication device 100 implementing one or more aspects of the present invention. The mobile communication device 100 illustrated herein is exemplary embodied in the form of a multifunction mobile phone. However, a person skilled in the art would readily appreciate that the mobile communication device 100 may be embodied in a variety of forms and may include a variety of features. For example, in alternate embodiments, the mobile communication device 100 may be a personal digital assistant, a digital camera, a digital camera enabled mobile phone, or other types of portable handheld devices.

The mobile communication device 100 includes a processing unit 102 coupled to a memory unit 104 and a transceiver 106. The transceiver 106 is coupled to an internal antenna 108 to receive and transmit signals to a wireless network. The wireless network may include the Global System for Mobile ("GSM") standard (such as GSM 900 and/or 1800 MHz), the Code Division Multiple Access (CDMA) standard, or the Third Generation ("3G") standard network. While the transceiver 106 is shown separate from the processing unit 102, alternate embodiments may also integrate the transceiver 106 in the processing unit 102. The processing unit 102 is configured to control the operation of the mobile device 100. In one embodiment, the processing unit 102 includes a digital signal processor ("DSP") 110 for converting and/or processing audio and/or video signals into analog and digital forms. An interface circuit 116 also couples the processing unit 102 to hardware resource, including a speaker 122, microphone 124, data transport module such as Bluetooth module 126, a keypad 128, a display device 130, and a motion sensor 132.

The speaker 122 produces analog audio signals provided by the DSP 110. These audio analog signals may come from voice communication signals received from a wireless network via the antenna 108, or from the playback of audio content files stored in the memory 104.

The microphone 124 is configured to receive sound signals that then may be converted into a digital form for transmission via the transceiver 106 to the wireless network. In another mode of operation, the sound signals received by the microphone 124 may also be recorded in a digital format to be stored in the memory 104 for playback.

The Bluetooth module 126 is configured to support wireless exchange of information data in a short radio frequency range, as specified in the Bluetooth standard. When it is enabled, the Bluetooth module 126 operates to detect the presence of Bluetooth-enabled external devices in proximity of the mobile communication device 100, and notifies the presence of such external devices to the user. After the user has chosen a detected Bluetooth compatible external device, such as the Bluetooth-enabled host device 140, the Bluetooth module 126 operates to establish a communication link between the mobile communication device 100 and the selected Bluetooth-enabled host device 140. The Bluetooth module 126 may be implemented in the form of a Bluetooth chip provided with its own antenna (not shown). It is worth noting that while the illustrated embodiment uses the Bluetooth protocol to implement wireless communication in a short distance range, other communication protocol standards, such as Wi-Fi, may also be applicable for the data transport module.

The keypad 128 and display device 130 allow a user to control and provide inputs to the mobile communication device 100. The keypad 128 may include a plurality of keys (not shown), such as alphanumeric keys, confirmation/rejection keys, a cursor navigation key, etc. The display device 130 may be a liquid crystal display. In alternate embodiments, the display device 130 may also be a touch panel adapted for receiving inputs from the user.

The motion sensor 132 determines the direction and magnitude of displacements of the mobile communication device 100 relative to a reference coordinate system, and converts the detected motion into displacement data. More specifically, the motion sensor 132 may include a 3-dimensions motion sensor that is able to measure displacements of the device 100 relative to three orthogonal axes. Examples of construction for the motion sensor 132 can include, without limitation, a sensor mechanism that incorporates accelerometers to take the gravitational force into accounts when determining an acceleration, a sensor mechanism with encoding disks on a freely rotatable shaft connected to a weight, or a sensor mechanism that uses sphere provided with an asymmetrical weight that floats in a liquid. In alternate embodiments, the motion sensor 132 can also include gyro elements to detect rotation displacements. In yet other embodiments, the motion sensor 132 may be of a miniaturized type, using Micro-Electro-Mechanical Systems (MEMS) technology that integrates mechanical elements, sensors, actuators, and electronics on a common silicon substrate through micro-fabrication technology.

The processing unit 102 is configured to execute diverse application programs stored in the memory 104 under management of an embedded operating system 134. Examples of applications installed in the mobile communication device 100 may include, without limitation, audio/video content player, image editor, organizer, game programs, etc. In the illustrated embodiment, a mouse function application 136 is also installed to enable the mobile communication device 100 to operate as a computer pointing device. When the computer mouse function is enabled, the motion sensor 132 detects 3-dimensional displacements of the mobile communication device 100 when it is manipulated by a user. The detected displacements of the mobile communication device 100 are processed by the mouse function application 136 into amounts of displacements data that are then transmitted to a host computer via the Bluetooth module 126 to control the position of a cursor on the host computer screen. In addition, any keys of the keypad 128 may be used as a click button for the computer mouse function.

Figure 2A:
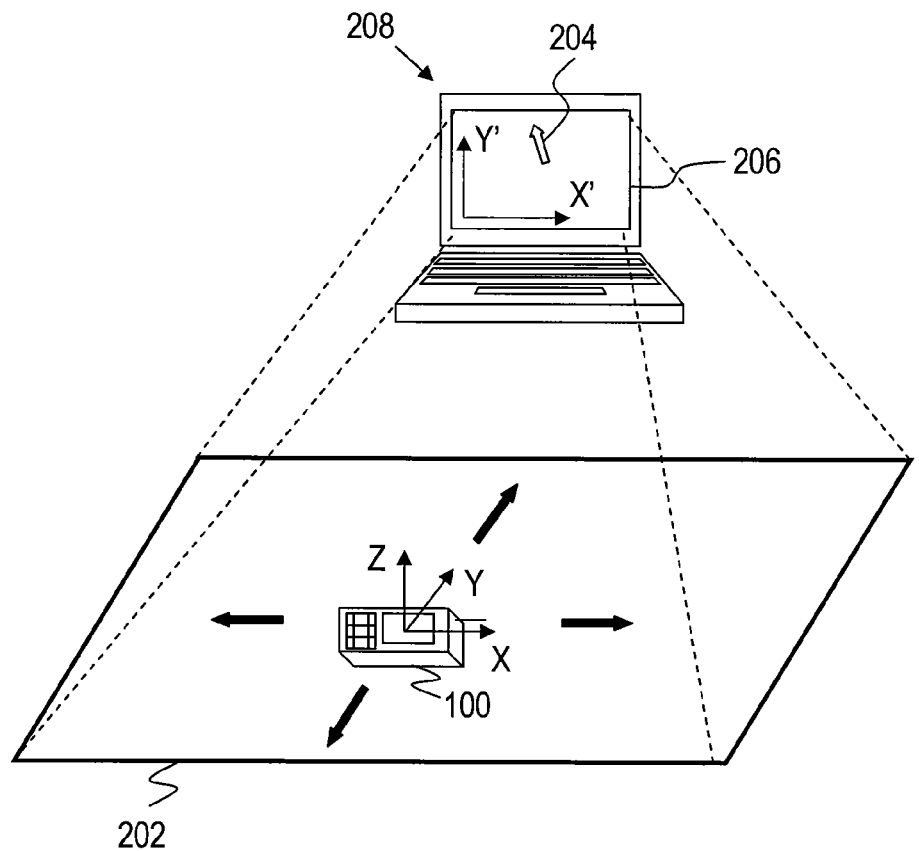
FIG. 2A is a schematic diagram illustrating a mobile communication device 1 configured into a first computer mouse mode of operation according to an embodiment of the present invention.
Figure 2B:
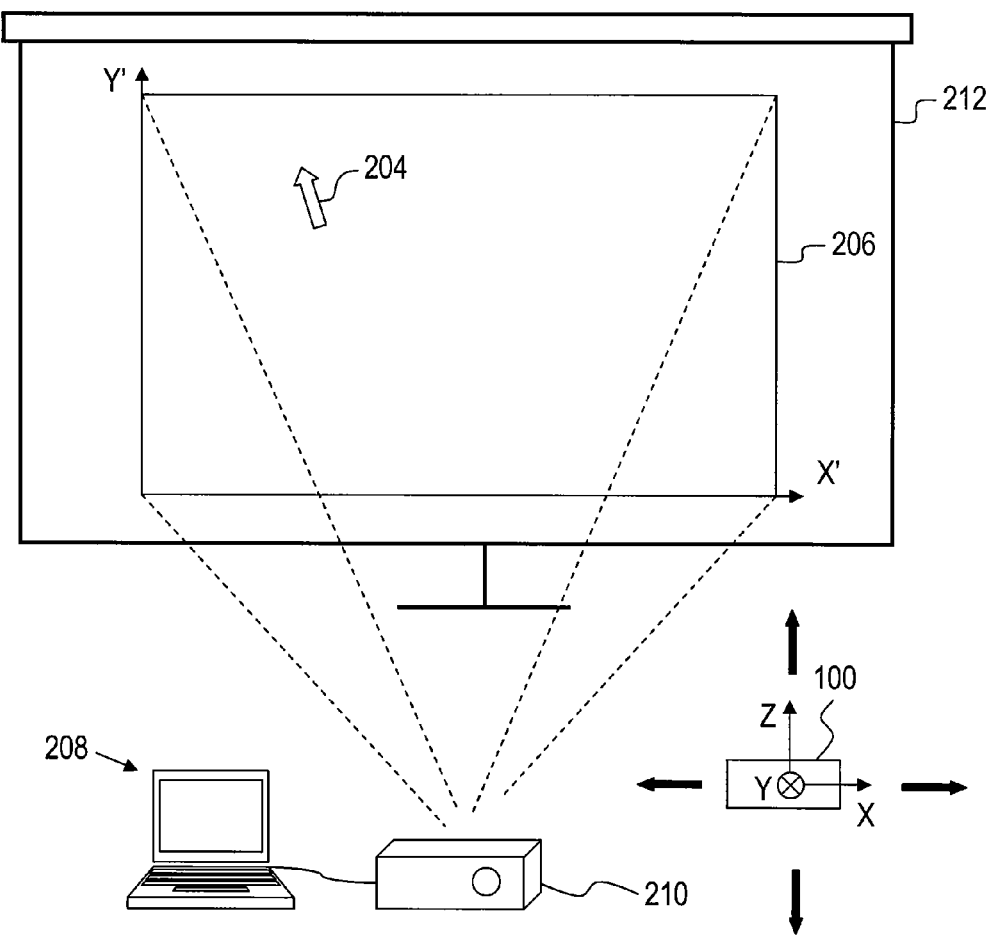
FIG. 2B is a schematic diagram illustrating a mobile communication device 1 configured into a second computer mouse mode of operation according to an embodiment of the present invention.
Figure 3:
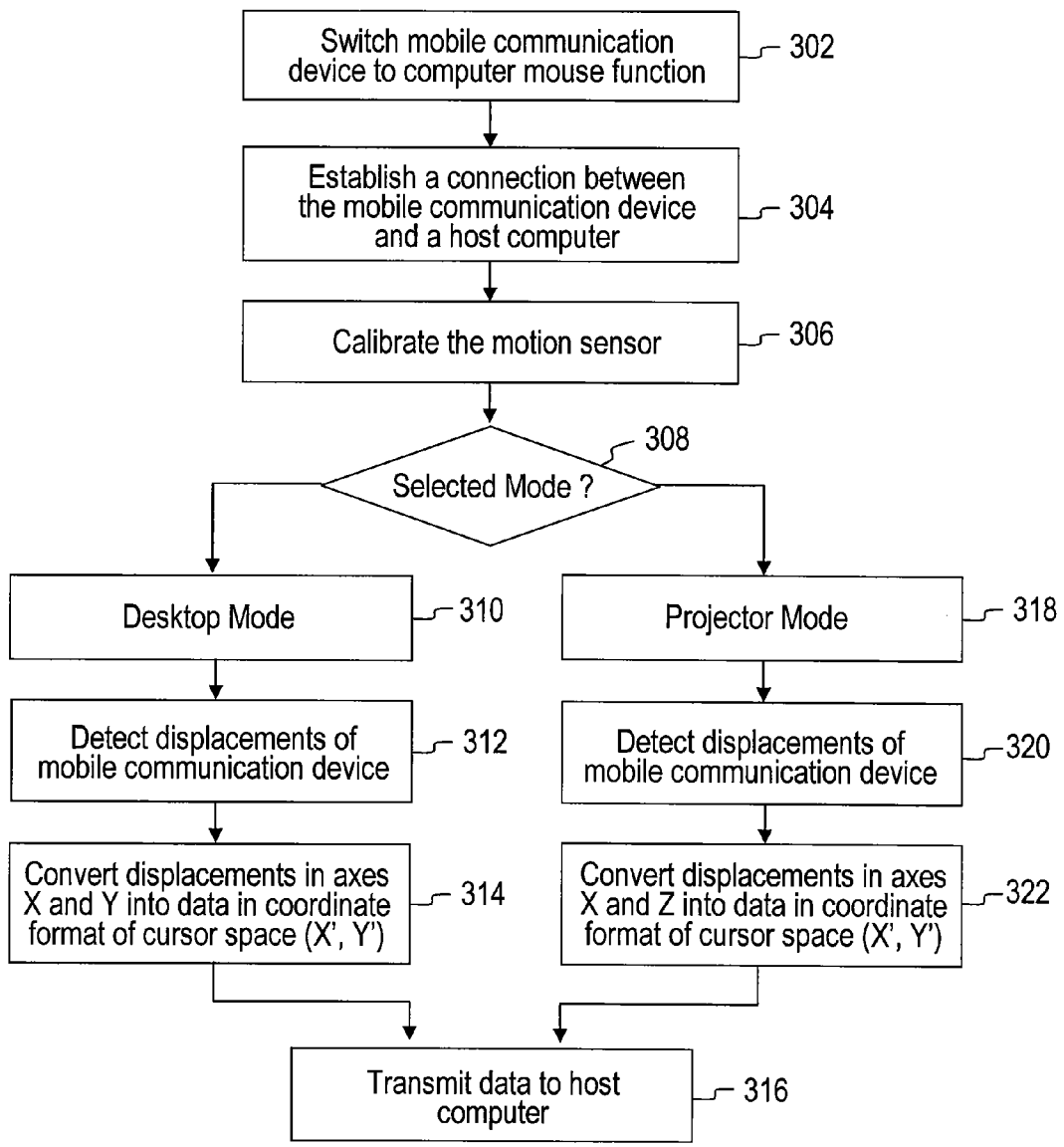
FIG. 3 is a flowchart of method steps for enabling a computer mouse function in a mobile communication device according to an embodiment of the present invention.

In conjunction with FIG. 1, FIGS. 2A and 2B are schematic diagrams illustrating the mobile communication device 100 configured into two computer mouse modes of operation, i.e. a desktop mode and a projector mode, according to an embodiment of the present invention. In FIG. 2A, a desktop mode of the computer mouse function is illustrated. In the desktop mode, the mobile communication device 100 can be used in a position that slidably rests on a planar surface 202, such as a top horizontal surface of a desktop. For the purpose of illustration, suppose the reference coordinate system (X, Y, Z) is associated with the mobile communication device 100 by the motion sensor 132, and the movement of the mobile communication device 100 on the surface 202 corresponds to a detected movement in the plane defined by the axes X and Y the device 100. In the desktop mode of operation, the mouse function application 136 thus converts the amounts of displacements along the axes X and Y into displacement data of a cursor 204 in a coordinate format compatible with the coordinate axes X' and Y' on the screen plane 206 of a host computer 208. For example, displacements of the device 100 along the axis X are converted into displacement data for the cursor 204 along the axis X', and displacements of the device 100 along the axis Y are converted into displacements data for the cursor 204 along the axis Y'. The mobile communication device 100 thus can be used to control the position of the cursor 204 on the computer screen plane 206, without the need of a traditional computer mouse.

FIG. 2B illustrates the projector mode of the computer mouse function. The mobile communication device 100 can be selectively switched to the projector mode when the host computer 208 is coupled to a projector 210 that projects the image of the screen plane 206 on a vertical board 212. In this projector mode, the cursor 204 can be controllably moved in the vertical plane of the board 212 by moving the mobile communication device 100 along the axes X and Z, which define a plane that is parallel to that of the vertical board 212. In this projector mode of operation, the mouse function application 136 thus only processes displacements of the mobile communication device 100 along the axes X and Z, and convert them into displacement data corresponding to displacements of the cursor 204 along the axes X' and Y' in the screen plane 206. For example, displacements of the device 100 along the axis X are converted into displacement data for the cursor 204 along the axis X', and displacements of the device 100 along the axis Z are converted into displacements data for the cursor 204 along the axis Y'. As the control movement of the mobile communication device 100 is made in a plane parallel to the projected screen plane 206 on the board 212, the control of the cursor 204 becomes more intuitive and natural to the user.

It is worth noting that the shown reference coordinate system comprising the axes X, Y and Z have been described for the purpose of illustration, and other orientations of these axes may be still applicable without changing the principles of operation for the computer mouse function of the mobile communication device 100.

In conjunction with FIG. 1 and FIGS. 2A and 2B, FIG. 3 is a flowchart of method steps performed for enabling a computer mouse function in a mobile communication device 100 according to an embodiment of the invention. In initial step 302, the mobile communication device 100 is switched to a computer mouse function. Once the computer mouse function is activated, initialization steps then are performed to properly configure the mobile communication device 100. For example, in step 304, the mobile communication device 100 establishes a connection link with a selected host computer 208 that will receive inputs from the mobile communication device 100 used as computer pointing device. In step 306, the motion sensor 132 may be calibrated with respect to the assigned reference coordinate system (X, Y, Z). Calibration may be performed by setting the position of the motion sensor 132 when activated as the zero reference. Once the initialization steps are completed, the mobile communication device 100 in step 308 then determines a mode of operation selected by the user for the computer mouse function, which may be either the desktop mode or projector mode described previously.

In step 310, the desktop mode has been selected. The motion sensor 132 in step 312 consequently detects displacements of the mobile communication device 100 in the reference coordinate system (X, Y, Z) associated with the mobile communication device 100. In step 314, the mouse function application 136 converts detected displacements of the device 100 along the axes X and Y into displacement data in a coordinate format compatible with the cursor space, which is defined by the axes X' and Y' of the screen plane 206 of the host computer 208. In step 316, the formatted displacement data are then processed for transmission by the Bluetooth module 126 to the host computer 208.

Instead of the desktop mode, the user may select the projector mode in step 318. Accordingly, the motion sensor 132 in step 320 detects displacements of the mobile communication device 100 in the reference coordinate system (X, Y, Z) associated with the mobile communication device 100. In step 322, the mouse function application 136 converts detected displacements of the device 100 along the axes X and Z into displacement data in the coordinate format of the cursor space, which is defined by the axes X' and Y'. Step 316 then is proceeded to process the formatted displacement data for transmission by the Bluetooth module 126 to the host computer 208.

Figure 4:
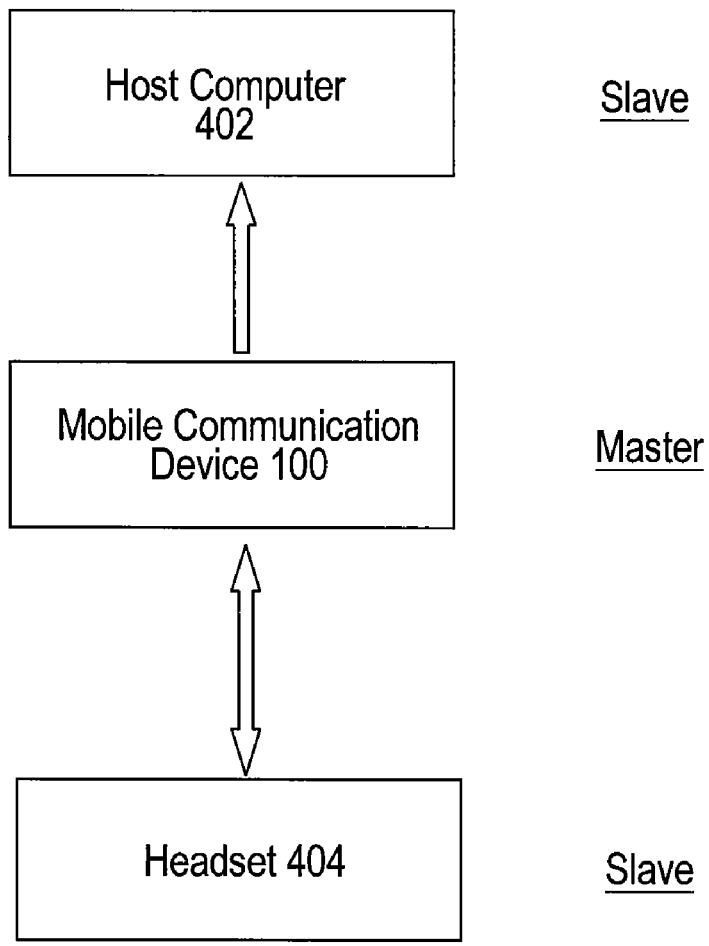
FIG. 4 is a diagram illustrating an example of use configuration of a mobile communication device according to an embodiment of the present invention.

While a computer mouse function has been specifically described above, it will be understood that additional functions may also be performed concurrently to the computer mouse function. In conjunction with FIG. 1, FIG. 4 is a diagram illustrating an example of use configuration in which the mobile communication device 100 may perform in parallel a computer mouse function with a Bluetooth enabled host computer 402, and voice communication with a Bluetooth enabled headset 404. In this configuration where the mobile communication device 100 is set as master device, the Bluetooth standard enables the mobile communication device 100 to exchange information via the Bluetooth module 126 with the host computer device 402 and the headset 404 in parallel. During operation, a physical radio channel is shared by the host computer 402 and the headset 404 that are slave devices synchronized to a common clock and frequency hopping pattern provided by the mobile communication device 100.

Figure 5:
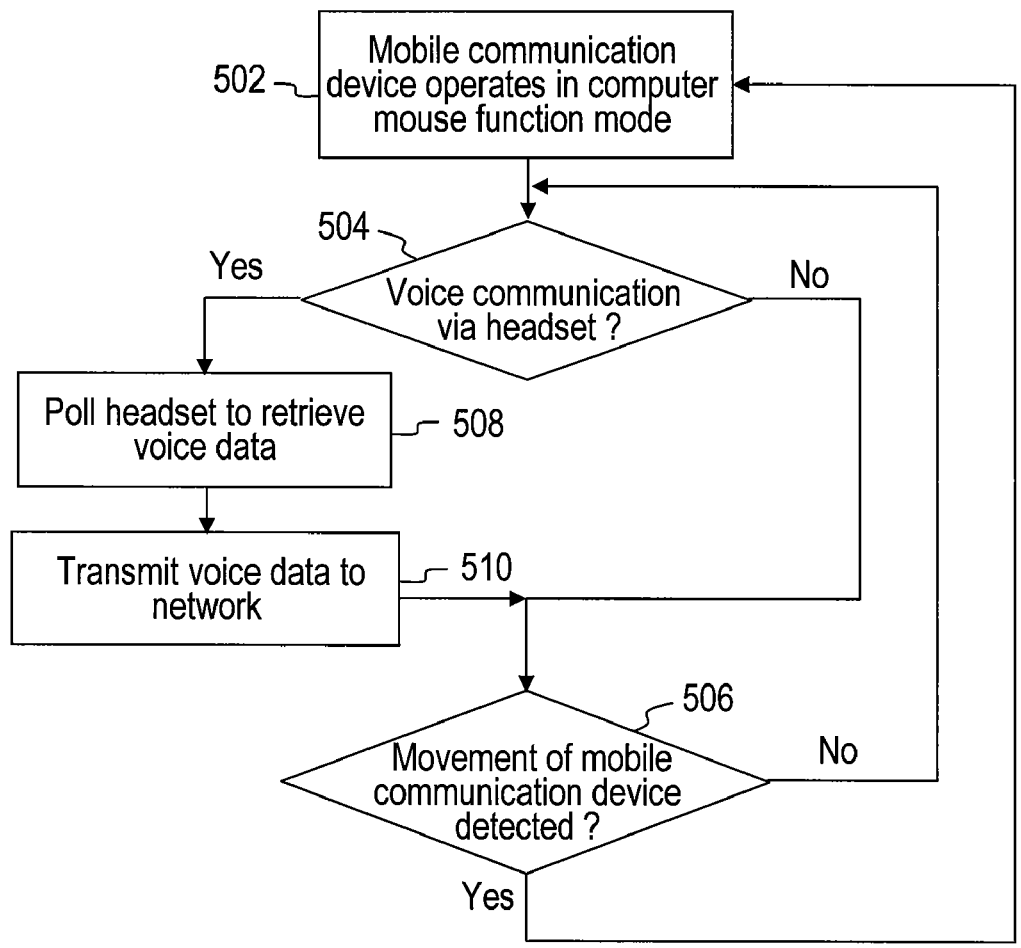
FIG. 5 is a flowchart of method steps for performing a computer mouse function and voice communication in parallel according to an embodiment of the present invention.

In conjunction with FIG. 4, FIG. 5 is a flowchart of method steps for performing a computer mouse function and voice communication in parallel according to an embodiment of the present invention. In step 502, suppose the mobile communication device 100 is operating in a computer mouse function mode. As described previously, the computer mouse function may include either a desktop mode or a projector mode of operation. In step 504, the mobile communication device 100 determines whether voice communication through the headset 404 is enabled. When voice communication is not enabled, the motion sensor integrated in the mobile communication device 100 determines whether there is any movement of the mobile communication device 100. In case the mobile communication device 100 is subject to movements, step 502 is performed to transmit mouse displacement data to the host computer device 402. Otherwise, return to step 504.

On the other hand, when the mobile communication device 100 has determined that voice communication through the headset 404 is enabled in step 504, the mobile communication device 100 in following step 508 polls the headset 404 to retrieve voice communication data. In step 510, the mobile communication device 100 then proceeds to transmit the voice communication data to the wireless network, which may be a GSM, CDMA, or 3G network. In case movements of the mobile communication device 100 are detected in step 506 while voice communication data are transmitted, the physical radio channel set by the Bluetooth module 126 may be divided into alternated time slots respectively allocated for the exchange of data packets between the mobile communication device 100 and the headset 404 (performed in steps 508 and 510) and for the exchange of mouse displacement data packets between the mobile communication device 100 and the host computer 402 (performed in step 502). Voice communication data and mouse movement data thereby may be processed in parallel in the mobile communication device 100.

As has been described above, the multifunction mobile communication device is thus able to also integrate a computer mouse functionality that enables a user to use the mobile communication device as a computer mouse to control a cursor on a host computer. No extra computer mouse thus is needed.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A mobile communication device, comprising:
   a motion sensor;
   a transceiver configured for long-range communication;
   a short-range wireless communication module; and
   a processing unit configured to operate in conjunction with the short-range wireless communication module and further configured to:
   determine whether the mobile communication device is to operate in a desktop mode or a projector mode;
   when in the desktop mode:
   establish via the short-range wireless communication module a communication link with a selected remote host device having a display screen adapted to visualize a cursor,
   convert amounts of displacement of the mobile communication device in a first direction and a second direction detected via the motion sensor into displacement data of the cursor in a two-dimensional coordinate format compatible with the display screen of the remote host device, and
   transmit via the short-range wireless communication module the displacement data to the remote host device; and
   when in the projector mode:
   establish via the short-range wireless communication module a communication link with a selected remote host device having a display screen adapted to visualize a cursor and coupled to a projector that projects images from the display screen to a vertical board, convert amounts of displacement of the mobile communication device detected in the first direction and a third direction via the motion sensor into displacement data of the cursor in the coordinate format compatible with the display screen of the remote host device, and transmit via the short-range wireless communication module the displacement data to the remote host device.

2. The device of claim 1, wherein the short-range wireless communication module implements a Bluetooth communication protocol.

3. The device of claim 1, wherein the motion sensor is configured to detect displacements of the mobile communication device in a 3-dimensions space.

4. The device of claim 1, further comprising:
a microphone; and
a speaker.

5. The device of claim 1, being configured as a mobile phone, a personal digital assistant, or a like handheld mobile device.

6. The mobile communication device of claim 1, wherein the processing unit is further configured to establish via the short-range wireless communication module a second communication link with a headset device, and wherein a physical radio channel set by the short-range wireless communication module is divided into alternated time slots respectively allocated for exchanging the displacement data between the mobile communications device and the host computer device and for exchanging voice communication data between the mobile communications device and the headset device such that the displacement data and the voice communication data may be processed in parallel by the mobile communication device.

7. The mobile communication device of claim 6, wherein both the displacement data and the voice communication data are exchanged via a Bluetooth communication protocol.

8. A method for controlling the position of a cursor on a display screen of a host device with a mobile communication device, the method comprising:
determine whether the mobile communication device is to operate in a desktop mode or a projector mode; and
when in desktop mode:
establishing a communication link via a short-range wireless communication module between the mobile communication device and a selected remote host device, wherein the host device has a display screen adapted to visualize a cursor,
detecting amounts of displacement of the mobile communication device in a first direction and a second direction,
converting the detected amounts of displacement into displacement data of the cursor in a two-dimensional coordinate format compatible with the display screen of the host device, and
transmitting via the short-range wireless communication module the displacement data to the host device; and
when in projector mode:
establishing a communication link via a short-range wireless communication module between the mobile communication device and a selected remote host device having a display screen adapted to visualize a cursor and coupled to a projector that projects images from the display screen to a vertical board,
detecting amounts of displacement of the mobile communication device in the first direction and a third direction,
converting the detected amounts of displacement into displacement data of the cursor in the two-dimensional coordinate format compatible with the display screen of the host device, and
transmitting via the short-range wireless communication module the displacement data to the host device.

9. The method of claim 8, wherein the short-range wireless communication module implements a Bluetooth communication protocol.

10. The method of claim 8, wherein detecting an amount of displacement of the mobile communication device comprises detecting displacements of the mobile communication device in a 3-dimensions space.

11. The method of claim 8, wherein the mobile communication device comprises a mobile phone, a personal digital assistant, or a like handheld mobile devices.

12. A system comprising:
a host computer device having a display screen adapted to visualize a cursor; and
a mobile communication device, comprising:
a motion sensor;
a transceiver configured for long-range communication;
a short-range wireless communication module;
a processing unit configured to operate in conjunction with the short-range wireless communication module and further configured to:
determine whether the mobile communication device is to operate in a desktop mode or a projector mode;
when in the desktop mode:
establish via the short-range wireless communication module a communication link with the host computer device,
convert amounts of displacement of the mobile communication device in a first direction and a second direction detected via the motion sensor into displacement data of the cursor in a two-dimensional coordinate format compatible with the display screen of the host computer device, and
transmit via the short-range wireless communication module the displacement data to the host computer device; and
when in the projector mode:
establish via the short-range wireless communication module a communication link with the host computer device coupled to a prosector that projects images from the display screen to a vertical board,
convert amounts of displacement of the mobile communication device detected in the first direction and a third direction via the motion sensor into displacement data of the cursor in the coordinate format compatible with the display screen of the host computer device, and
transmit via the short-range wireless communication module the displacement data to the host computer device.

13. The system of claim 12, wherein the mobile communication device further comprises a microphone and a speaker.

14. The system of claim 12, wherein the motion sensor is configured to detect displacements of the mobile communication device in a 3-dimensions space.

15. The system of claim 12, wherein the processing unit is further configured to establish via the short-range wireless communication module a second communication link with a headset device, and wherein a physical radio channel set by the short-range wireless communication module is divided into alternated time slots respectively allocated for exchanging the displacement data between the mobile communications device and the remote host device and for exchanging voice communication data between the mobile communications device and the headset device such that the displacement data and the voice communication data may be processed in parallel by the mobile communication device.

16. The system of claim 15, wherein both the displacement data and the voice communication data are exchanged via a Bluetooth communication protocol.

17. The method of claim 8 further comprising establishing via the short-range wireless communication module a second communication link with a headset device, wherein a physical radio channel set by the short-range wireless communication module is divided into alternated time slots respectively allocated for exchanging the displacement data between the mobile communications device and the remote host device and for exchanging voice communication data between the mobile communications device and the headset device such that the displacement data and the voice communication data may be processed in parallel by the mobile communication device.

18. The method of claim 17, wherein both the displacement data and the voice communication data are exchanged via a Bluetooth communication protocol.

\* \* \* \* \*

UNITED STATES PATENT AND TRADEMARK OFFICE
CERTIFICATE OF CORRECTION

PATENT NO. : 8,150,455 B2
APPLICATION NO. : 11/945990
DATED : April 3, 2012
INVENTOR(S) : Chien-Chung Chung It is certified that error appears in the above-identified patent and that said Letters Patent is hereby corrected as shown below:

Column 8 Claim 12, line 48, delete "prosector" and replace with "projector".

Signed and Sealed this
Twentieth Day of November, 2012

David J. Kappos
*Director of the United States Patent and Trademark Office*